March 19, 1935.  F. R. PERSON  1,994,590
VEHICLE SUSPENSION
Filed Jan. 2, 1934  2 Sheets-Sheet 1
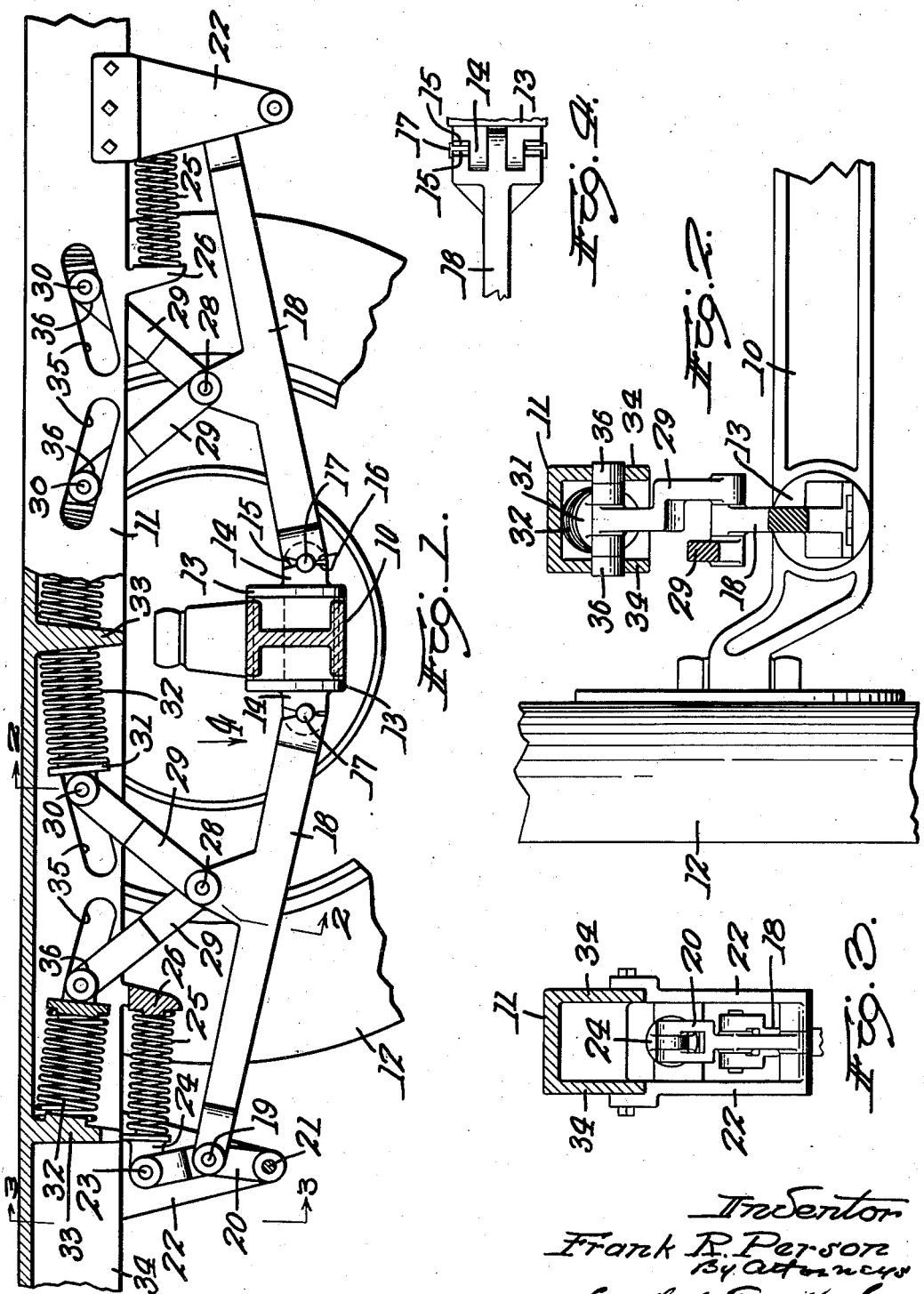
Inventor
Frank R. Person March 19, 1935.  F. R. PERSON  1,994,590
VEHICLE SUSPENSION
Filed Jan. 2, 1934  2 Sheets-Sheet 2
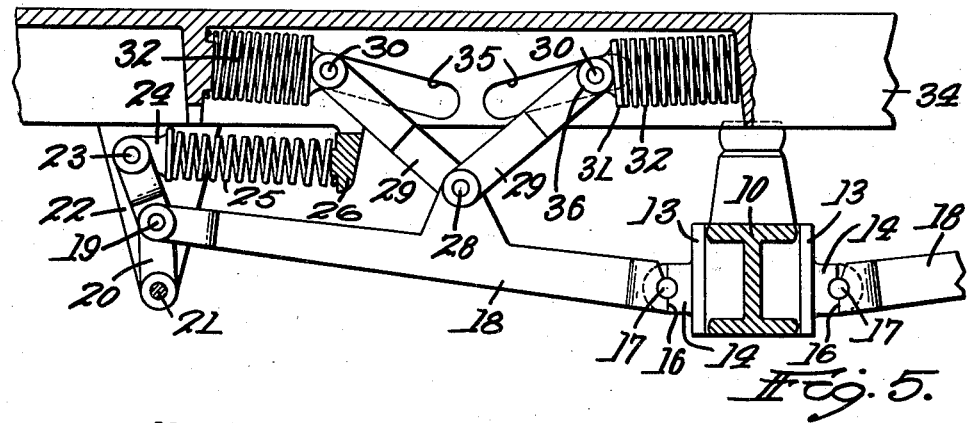
Fig. 5.
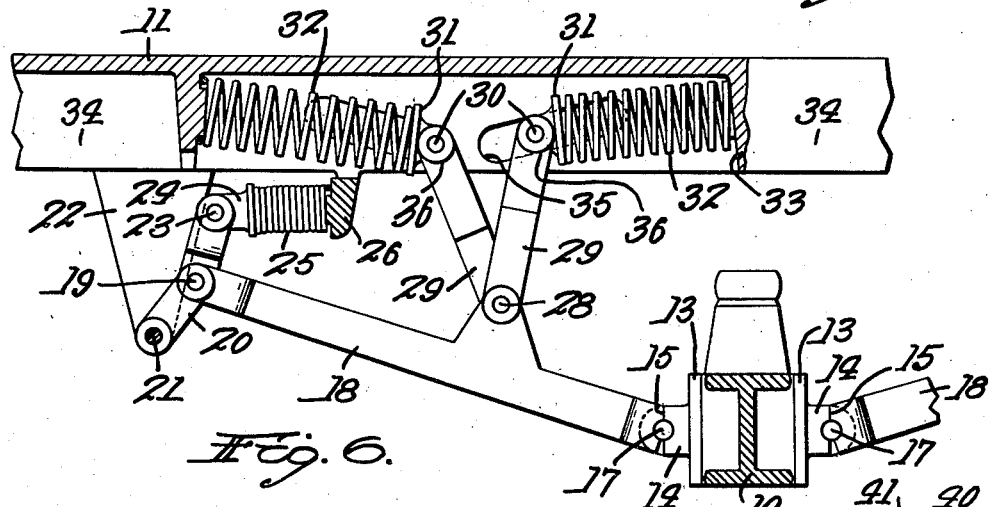
Fig. 6.
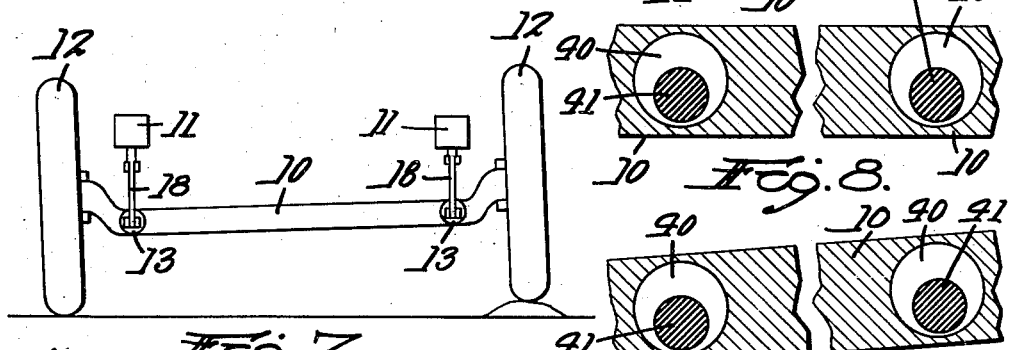
Fig. 7.
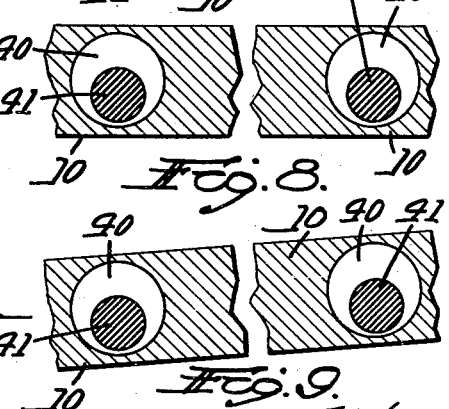
Fig. 8.
Fig. 9.
Inventor
Frank R. Person
By Attorneys
Southgate Fay & Hawley
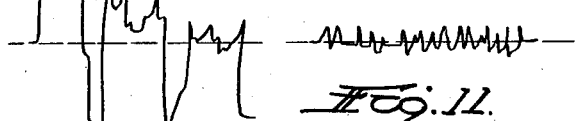
Fig. 10.
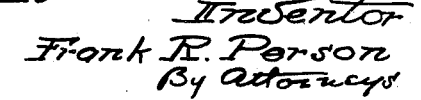
Fig. 11.

Patented Mar. 19, 1935

1,994,590

UNITED STATES PATENT OFFICE 1,994,590

VEHICLE SUSPENSION

Frank R. Person, Worcester, Mass.

Application January 2, 1934, Serial No. 704,849

6 Claims. (Cl. 267—20)

The principal object of this invention is to provide a suspension for the frame or chassis of a motor car, aeroplane, or any other vehicle, that will prevent the chassis or frame moving a great deal when any one of the four wheels strikes an obstacle in the road, even if one wheel is raised by such an obstacle a maximum amount and at the same time a wheel on the other side is similarly lowered by a depression in the road. This object is secured by providing a spring resistance to the rise and fall of the chassis relative to the action and providing a cam to control the same and support the frame from the parts connected to the axle.

Other objects of the invention are to provide movable means for supporting the free ends of levers used to secure the above results, to cushion the longitudinal jars to which the vehicle may be subjected, and to provide means for preventing the binding of these parts when the vehicle is forced to assume a transversely inclined position.

Other objects and advantages of the invention will appear hereinafter.

Reference is to be had to the accompanying drawings, in which

Fig. 1 is a side view of a vehicle suspension, partly in section, showing a preferred embodiment of this invention;

Fig. 2 is a sectional view on the broken line 2—2 of Fig. 1;

Fig. 3 is a sectional view on the line 3—3 of Fig. 1;

Fig. 4 is a plan of a pivot connection as indicated by the arrow 4 in Fig. 1;

Fig. 5 is a view of some parts shown in Fig. 1 illustrating the axle as in its limiting highest position;

Fig. 6 is a similar view showing the axle in its limiting lowered position;

Fig. 7 is a front view of one of the axles showing the action when one of the wheels rises;

Fig. 8 is a sectional view of the axle taken in a vertical plane transverse to the body of the vehicle showing the connection of the suspension devices on both sides with the axle;

Fig. 9 is a similar view showing the axle in the position shown in Fig. 7;

Fig. 10 is a graph, such as has actually been taken, showing the motion of the axle, and Fig. 11 is a similar graph showing how the vibrations are reduced as they are transmitted to the chassis.

The invention is shown as applied to an axle 10 and the frame or chassis 11 of an automobile. The axle of course carries the wheels 12 in a usual manner. The axle carries a pivot member 13 which is not fixedly secured thereto but is incapable of any movement thereon in the direction of the long dimension of the car. On opposite sides it is provided with lugs 14 having two stops 15 and 16 and a transverse pivot stud 17. On each pivot stud 17 is pivoted an inclined lever 18. These two levers on opposite sides of the axle extend forwardly and rearwardly respectively.

The free end of each of the levers 18 is provided with a stud 19 by which it is pivoted to a lever 20 in turn pivoted on a stud 21 carried by a lug 22 fixed to the chassis 11. The upper end of the lever 20 is provided with a pivot stud 23 which is connected with a head 24 of a compression spring 25. The other end of this spring is held against a lug 26 also carried in fixed position by the chassis. The object of this construction is to provide means for supporting the free ends of the levers 18 movably with respect to the chassis and these springs 25, one at the front and the other at the rear, absorb the shocks transmitted longitudinally to the car.

On each lever 18, nearly halfway from the pivot stud 17 to the stud 19, is a pivot stud 28 and this stud serves as a pivotal point for two upwardly extending links 29. These two links are arranged to diverge from each other and each one is provided at its upper end with a pivot stud 30 for pivotally receiving a head 31 of a device for resisting the upward motion of the axle. This is shown as a compression spring 32 which is backed up at the other end against a lug 33 integral with the chassis. The two springs are arranged oppositely but both have the same effect.

A vertical flange 34 of the channel iron forming the side on the chassis carries two cam slots 35 at each side of the axle. The studs 30 are provided with rollers 36 which work in these slots.

By this construction the chassis is supported by the several rollers 36 in the cam slots 35 and the springs 32 resist up and down motion. Also the thrust is divided by the location of the stud 28 and also by the use of the two springs and two links connected to the stud 28. This permits smaller springs to be used than would be the case with only one. They are so small in fact that they can be located in the channel iron which constitutes the side of the chassis or frame, as shown.

These cams also constitute guides and it will be seen that, as the lever 18 rises and descends, the studs 30 are limited to a definite line of motion in these slots. A neutral position of the parts is shown in Fig. 1 while in Fig. 5 the parts are shown with the levers 18 forced upwardly as far as they will go by the rise of the axle.

It will be seen that the lever is at its uppermost position because one of the stops 16 is acting to prevent further rise. The rise of the axle forces the two links 29 to move oppositely and outwardly at their upper ends so as to compress the two springs 32. When the axle goes as far down as possible, as shown in Fig. 6, these studs and their rollers are brought inwardly toward each other and the springs expanded.

From this it will be seen that the shock of the sudden rise or fall of the axle is transmitted to the chassis through the springs 32 and in such a way as to reduce the shock very materially and that the action on these springs is controlled and guided by the cams 35. Likewise the downward motion of the wheel is resisted and the shock cushioned as shown.

The member 13 is supported by a journal 41 in the axle through an eccentric 40. When the axle swings as shown in Figs. 7 and 9, there would be binding of these parts, if it were not for this eccentric. The eccentric is capable of turning slightly and must turn slightly on account of its connections with the levers 18. The levers 18 are, of course, not rotatable, thus allowing the rise and fall of one end of the axle without binding this journal.

By the construction above described the vehicle frame is not subjected to shocks of as great an amplitude as the axle but these shocks are cushioned both on the up and down motion, and resisted. Most of the shock on the rebound is taken up by the cam slots. The diagram in Fig. 10 is an actual copy of a diagram taken by the usual methods for the showing of shocks to which the axle is subjected. Fig. 11 is a diagram of the shocks to which the chassis is subjected at the same time. A comparison of these two diagrams shows the diminutions in the vibration of the chassis secured by this invention.

Having thus described my invention and the advantages thereof, I do not wish to be limited to the details herein disclosed, otherwise than as set forth in the claims, but what I claim is:—

1. In a vehicle suspension, the combination with the vehicle frame and an axle therefor, of a lever pivoted to the axle and extending longitudinally of the frame, means for movably supporting the free end of the lever from the frame, a link pivotally connected with the lever between its pivot and said means, yielding means for connecting the link directly with the frame, and a cam on the frame for controlling the motion of the end of the link and supporting the frame.

2. In a vehicle suspension, the combination with the vehicle frame and an axle, of a lever pivoted on an axis parallel to the axle and extending therefrom longitudinally of the frame, means for movably connecting the free end of said lever to the frame, two links pivoted to the lever and extending upwardly therefrom, one extending at an inclination forwardly and the other backwardly, two substantially horizontally operating yielding devices, each pivotally connected with the top of one of said links, and means for movably connecting the last two pivotal connections with the frame for supporting it therefrom.

3. In a vehicle suspension, the combination with the vehicle frame and an axle therefor, of a lever pivoted to the axle, means for movably supporting the free end of the lever from the frame, a link pivotally connected with the lever, a pivot stud carried by the top of the link, a roller on the pivot stud, the frame having an inclined cam slot in which said roller is movable to help support the frame, and means for constantly resisting the motion of the roller upwardly in said slot.

4. In a vehicle suspension, the combination with the vehicle frame and an axle, of a lever pivoted on an axis parallel to the axle and extending longitudinally of the frame, means for movably connecting the free end of said lever to the frame, two links pivoted to the lever and extending upwardly therefrom, one extending at an inclination forwardly and the other backwardly, two substantially horizontal oppositely working compression springs supported by the chassis on opposite sides of the links, pivots connecting the springs with the links, two oppositely inclined cam slots in the frame, and rollers on said pivots and movable in said slots.

5. In a vehicle suspension, the combination with the vehicle frame and an axle therefor, of a lever pivoted to the axle and extending longitudinally of the frame, means for movably supporting the free end of the lever from the frame, a link pivotally connected with the lever, yielding means for connecting the link with the frame, and a cam on the frame for controlling the motion of the end of the link and supporting the frame, and yielding means for resisting the downward motion of the free end of the lever.

6. In a vehicle suspension, the combination with the vehicle frame and an axle therefor, of a lever pivoted to the axle, means for movably supporting the free end of the lever from the frame, a link pivotally connected with the lever, yielding means for connecting the link with the frame, and a cam on the frame for controlling the motion of the end of the link supporting the frame, and an eccentric bearing for oscillatably supporting the first named end of the lever on the axle, said bearing being arranged to turn slightly when the axle is tilted to prevent binding of the lever therein.

FRANK R. PERSON.